(12) United States Patent
Kelly et al.

(10) Patent No.: US 11,018,964 B2
(45) Date of Patent: May 25, 2021

(54) SELECTIVE EXTRACTION OF NETWORK LINK TRAINING INFORMATION

(71) Applicant: Tektronix, Inc., Beaverton, OR (US)

(72) Inventors: David L. Kelly, Portland, OR (US);
Patrick A. Smith, Beaverton, OR (US);
Jed H. Andrews, Aloha, OR (US);
Keith D. Rule, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 15/395,600

(22) Filed: Dec. 30, 2016

(65) Prior Publication Data
US 2017/0207987 A1   Jul. 20, 2017

Related U.S. Application Data

(60) Provisional application No. 62/280,662, filed on Jan. 19, 2016.

(51) Int. Cl.
*H04L 12/26* (2006.01)
*H04L 12/24* (2006.01)

(52) U.S. Cl.
CPC .......... *H04L 43/08* (2013.01); *H04L 41/0816* (2013.01); *H04L 43/50* (2013.01);
(Continued)

(58) Field of Classification Search
None
See application file for complete search history.

(56) References Cited

U.S. PATENT DOCUMENTS

| 7,173,943 B1* | 2/2007 | Borchew ................ H04L 43/18 370/366 |
| 2009/0082982 A1* | 3/2009 | Cain .................. G01R 13/0254 702/77 |

(Continued)

FOREIGN PATENT DOCUMENTS

| EP | 2482084 A2 | 8/2012 |
| EP | 2930518 A2 | 10/2015 |

OTHER PUBLICATIONS

Brink, Rob : 10GBase-KR Start-Up Protocol IEEE P802.3.ap Task Force Jan. 24, 2005 (Year: 2005).*

(Continued)

*Primary Examiner* — Jeffrey M Rutkowski
*Assistant Examiner* — Basil Ma
(74) *Attorney, Agent, or Firm* — Miller Nash Graham & Dunn; Andrew J. Harrington (57) ABSTRACT

An apparatus and method that captures a complete history of serial network Link Training negotiations by continuously monitoring multiple analog signals representing both sides of full duplex lanes in real-time by pattern matching the Link Training Frame Marker and the subsequent negotiation request/response data values. The apparatus and method compare the digitized version of the incoming signal against a nominal pattern at the start to find the Frame Markers and Control Channel data, storing only those Control Channel data values that do not match the current compare pattern, and further by updating the current compare pattern to the new pattern just received, so that only the transitions in the data values are stored, thereby vastly reducing the amount of data presented to the user, but nonetheless retaining the complete substantive history of the Link Training negotiations.

17 Claims, 8 Drawing Sheets

(52) U.S. Cl.
CPC .......... *H04L 41/0631* (2013.01); *H04L 41/22* (2013.01); *H04L 43/04* (2013.01)

(56) References Cited

U.S. PATENT DOCUMENTS

| | | | | |
|---|---|---|---|---|
| 2009/0219978 | A1* | 9/2009 | Mobin | H04L 25/03006 375/219 |
| 2013/0145212 | A1* | 6/2013 | Hsu | G06F 11/2733 714/27 |
| 2013/0343400 | A1* | 12/2013 | Lusted | H04L 12/413 370/419 |
| 2014/0122696 | A1* | 5/2014 | Gronlund | H04L 43/045 709/224 |
| 2015/0163019 | A1 | 6/2015 | Birrittella | |

OTHER PUBLICATIONS

Extended European Search Report for European Patent Application No. 17152305.3, dated May 26, 2017 (9 pages).

\* cited by examiner

Results Table for One Lane

| Lane 1 | | | | | | | | | | | | | |
|---|---|---|---|---|---|---|---|---|---|---|---|---|---|
| Channel 1 | | | | | | | | Channel 3 | | | | | |
| Request | | | Response | | | | | Request | | | Response | | |
| Preset Init C(+1) C(0) C(-1) | | | Ready C(+1) C(0) C(-1) | | | | | Preset Init C(+1) C(0) C(-1) | | | Ready C(+1) C(0) C(-1) | | |
| Normal Init Inc Dec Hold | | | Normal Min Max Updated Min | | | | | Normal Init Inc Dec Hold | | | Normal Min Max Updated Min | | |
| Preset Normal | | | Normal | | Updated | Min | | Preset Normal | | | Normal | Updated | Min |
| Normal | Inc | | | Min | | | | Normal | Inc | | | Min | |
| ∅ | | | ∅ | | | | | ∅ | | | ∅ | | |
| Normal Init Inc Dec Hold | | | Normal Min Max Updated | | | | | Normal Init Inc Dec Hold | | | Normal Min Max Updated | | |

Legend:
Coefficient Update (Requests)
 Column Header          Field Text                                 Field Value
  Preset                Normal/Preset                              [0..1]
  Initialize            Normal/Initialize                          [0..1]
  Parity                Even/Odd                                   [0..1]
  Coefficient Update    Hold/Decrement/Increment/Reserved          [0..3]

Status Report (Responses)
 Column Header          Field Text                                 Field Value
  Receiver Ready        Continue/Ready Receiver Status             [0..1]
  Coefficient Status    NotUpdated/Updated/Min/Max                 [0..3]

A Blank Field Means No Change Occurred in that Field from one row to the next

| Cell(s) | Name | Description |
|---|---|---|
| 15:14 | Reserved | Transmitted as 0, ignored on reception. |
| 13 | Preset | 1 = Preset coefficients<br>0 = Normal operation |
| 12 | Initialize | 1 = Initialize coefficients<br>0 = Normal operation |
| 11:7 | Reserved | Transmitted as 0, ignored on reception. |
| 6 | Parity | Even parity of all other coefficient update cells. |
| 5:4 | Coefficient (+1) update | 5 4<br>1 1 = reserved<br>1 0 = increment<br>0 1 = decrement<br>0 0 = hold |
| 3:2 | Coefficient (0) update | 3 2<br>1 1 = reserved<br>1 0 = increment<br>0 1 = decrement<br>0 0 = hold |
| 1:0 | Coefficient (−1) update | 1 0<br>1 1 = reserved<br>1 0 = increment<br>0 1 = decrement<br>0 0 = hold |

FIGURE 7

| Cell(s) | Name | Description |
|---|---|---|
| 15 | Receiver ready | 1 = The local receiver has determined that training is complete and is prepared to receive data<br>0 = The local receiver is requesting that training continue. |
| 14:6 | Reserved | Transmitted as 0, ignored on reception. |
| 5:4 | Coefficient (+1) status | 5 4<br>1 1 = maximum<br>1 0 = minimum<br>0 1 = updated<br>0 0 = not_updated |
| 3:2 | Coefficient (0) status | 3 2<br>1 1 = maximum<br>1 0 = minimum<br>0 1 = updated<br>0 0 = not_updated |
| 1:0 | Coefficient (−1) status | 1 0<br>1 1 = maximum<br>1 0 = minimum<br>0 1 = updated<br>0 0 = not_updated |

FIGURE 8

SELECTIVE EXTRACTION OF NETWORK LINK TRAINING INFORMATION

CROSS-REFERENCE TO RELATED APPLICATION

This application claims the benefit of U.S. Provisional Patent Application No. 62/280,662, entitled "SELECTIVE EXTRACTION OF NETWORK LINK TRAINING INFORMATION" and filed on Jan. 19, 2016, the disclosure of which is hereby fully incorporated by reference herein.

TECHNICAL FIELD

This disclosure relates to test and measurement instruments, and more particularly to testing, measuring, and analyzing serial communications.

BACKGROUND

Information technologies and trends, from pervasive online social media, to so-called cloud computing, to mobile gaming, to streaming video on-demand, as well as others, are all helping to drive ever-increasing consumer demands for higher and higher levels of communication network performance. Accordingly, network operators, online service providers, and electronics manufacturers are all motivated to develop network protocols that achieve ever-higher bandwidth to deliver ever-larger amounts of data to users.

Figure 1:
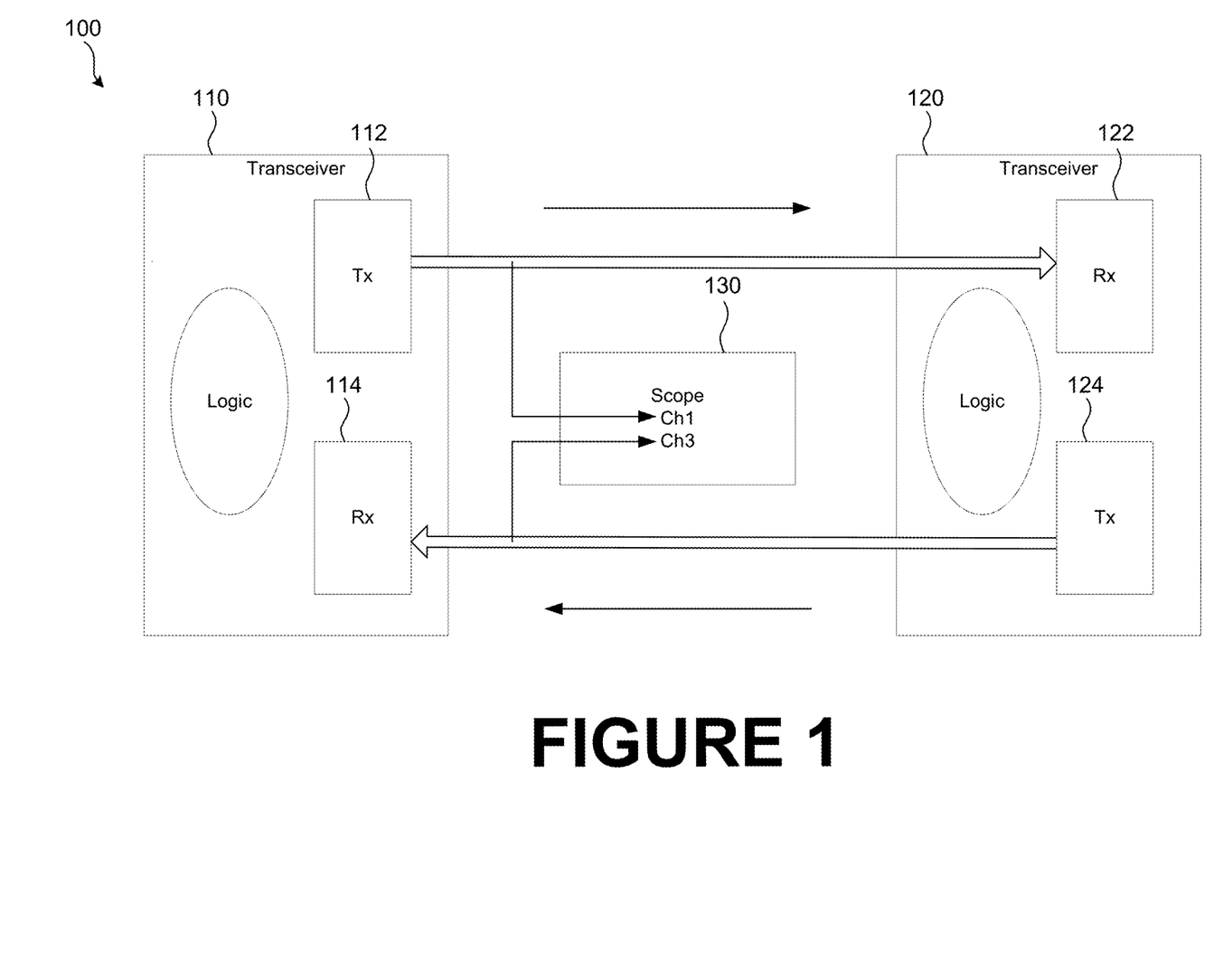
FIG. 1 is a block diagram of a typical serial communications network that is analyzed by certain implementations of the disclosed technology.

Many contemporary serial data communication network protocols generally include two transceivers linked together by wire or optical fiber. These links often comprise "full-duplex" lanes, as depicted in FIG. 1. Modern high-speed protocols, such as 100 Gbps Ethernet, operate at such high speeds that the protocols specify a link training procedure, in which the two transceivers engage in communication and a process of negotiating various settings to optimize the bandwidth and signal integrity for the data communicated over the link. See, e.g., U.S. Pat. App. Pub. No. 2013/0343400 (Dec. 26, 2013), for one example of a possible link training process. See also IEEE 802.3ba-2010 for the original version of the 100 Gbs Ethernet standard, as well as subsequent revisions.

Engineers need to be able to quickly and easily monitor and analyze these network link training sessions to troubleshoot any errors that may occur during the training, and to pinpoint and correct the source of the error. Debugging link training sessions is of particular interest when interoperable solutions are needed—that is, when one end of the link is controlled by a device made by a first vendor, and the other end of the link is controlled by a device made by a second vendor—to determine where a link training fault may lie.

Embodiments of the invention address these and other limitations of the prior art.

DETAILED DESCRIPTION

The general environment for monitoring a link training session in a high-speed serial communications network, such as a 100 Gbps Ethernet network, is depicted in FIG. 1, which illustrates a single 25 Gbps lane of a typical network 100 in which a first transceiver 110 has a transmit (Tx) portion 112 and a receive (Rx) portion 114 that are physically connected, respectively, to a receive (Rx) portion 122 and a transmit (Tx) portion 124 of a second transceiver 120, e.g., by wire. In this configuration, this lane of the network is full-duplex, and the network devices are able to carry on two simultaneous "conversations" with each other. A link training process on this lane may be monitored by connecting an appropriate test and measurement instrument, such as an oscilloscope 130, to the wires between the two transceivers 110 and 120 and observing the signals being sent and received by the two devices.

Traditionally, the link training process has been analyzed by first using the oscilloscope 130 to acquire the signals that are communicated during the link training process, then, post-acquisition, passing this acquired data to specialized analysis software. In particular, this acquire-then-analyze technique has been used to analyze and extract the Control Channel information that is exchanged during the link training process.

However, this traditional post-acquisition extraction of Link Training Control Channel information from a digitized analog signal in an oscilloscope is very time consuming. Large record lengths are needed to store the digitized version of the data, even for a very short time spans. For example, acquiring and post-processing (e.g. filter, interpolate, mark, decode, etc.) a 1 Gbyte digitized waveform covering a 40 ms time span, even at less than the maximum sampling rate of the oscilloscope, can take 5 minutes or more, using contemporary multi-core CPUs in an oscilloscope. Since, for example, 100 Gb Ethernet Link Training sessions may take up to an order of magnitude more time to complete—i.e., 500 ms—analysis of such a session using the traditional post-acquisition analysis may take close to an hour. Moreover, these times reflect the analysis of only half of a full duplex communication lane. Multiple complete lanes may need to be monitored to give a complete status of a Link Training session, which further increases the required analysis time using traditional methods.

Although the traditional post-processing approach is still very valuable to capture waveforms that can be marked, decoded, and measured by software tools such as Advanced Search and Mark, Bus Decoders, and DPOJET—a jitter, timing, and eye diagram analysis tool made by Tektronix, Inc.—the overall time required for this post-processing approach is just too great for reasonable Link Training debugging tasks, and can be highly undesirable for many users.

Furthermore, it is noted that the vast majority of the Link Training Control Channel information produced using the traditional analysis method is redundant, causing information overload for the oscilloscope user. For example, a single 100 Gbps Ethernet lane may transmit over 5 million control channel data blocks during a single link training session—far too many records for a human user to manually view.

Figure 2:
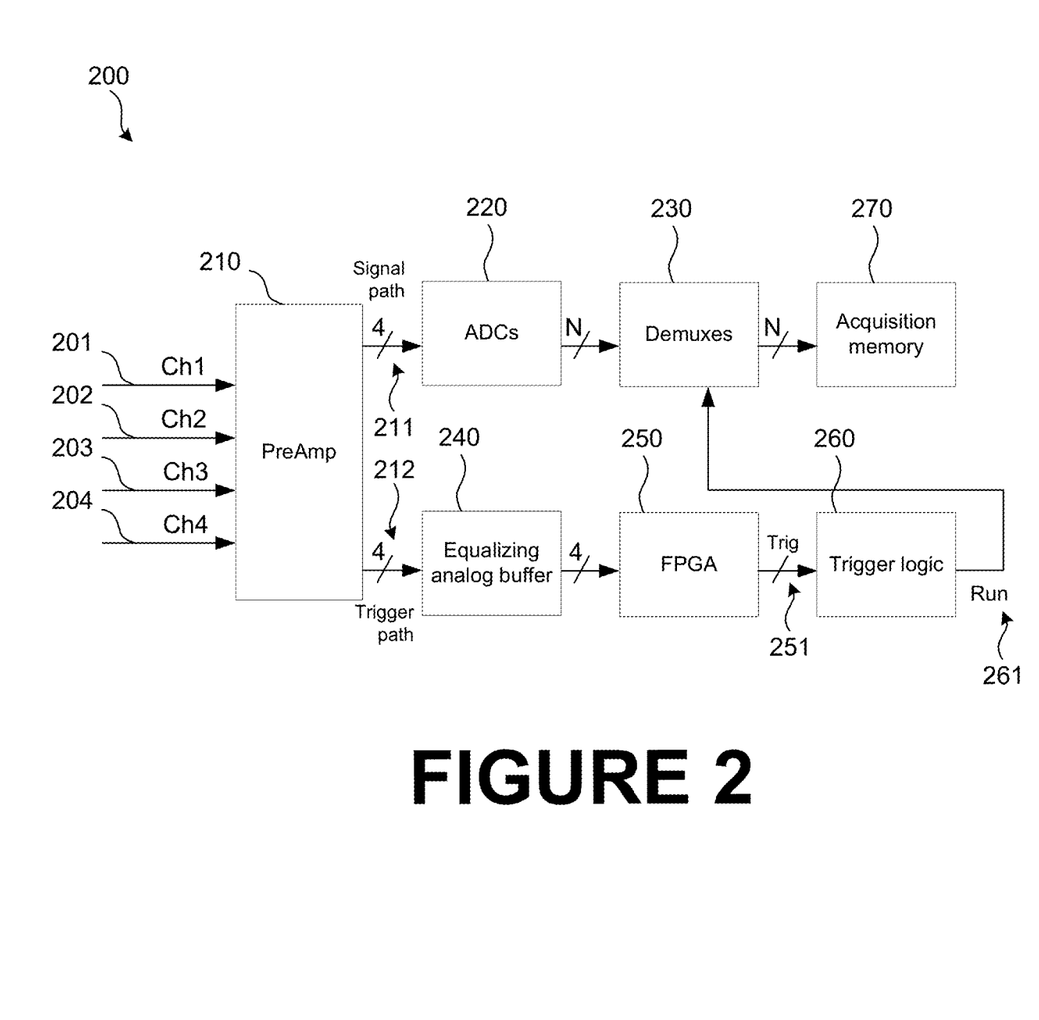
FIG. 2 is a block diagram of a test and measurement instrument in accordance with certain implementations of the disclosed technology.

To address these problems of excessive analysis time and information overload, FIG. 2 illustrates a block diagram of one example embodiment of a test and measurement instrument 200, such as a DPO70000SX series oscilloscope manufactured by Tektronix, Inc., that enables a new real-time method for extracting and analyzing Link Training Control Channel information from analog signals.

The oscilloscope 200 has four analog input channels CH1-CH4 201-204 into a front end block 210, e.g., a preamplifier. The front end block 210 performs amplification and signal conditioning on the input signals 201-204, and splits the input signals 201-204 into two analog signal paths 211, 212. One analog signal path 211 is routed to an analog-to-digital conversion (ADC) block 220 for digitizing of the analog signals 211. The outputs of the ADC block 220 are then routed to a demultiplexer (demux) block 230 for storage in acquisition memory 270. The demux block 230, in response to a trigger signal from a trigger logic block 260, acquires the digitized signals from the ADC block 220 into the acquisition memory 270 for display on a display screen, according to known methods. The second analog signal path 212 is routed to trigger circuitry 240, 250, 260. First, the analog input signals 201-204 are passed to an equalizing analog buffer block 240. The buffer block 240 performs equalization and buffering of the high-speed signals 212 which are then routed to a serial trigger FPGA 250. As described further below, the serial trigger circuit 250 extracts link training information from the data stream 212 for analysis and display, and may also generate a trigger output signal 251 if it detects that certain configurable criteria are met. The trigger signal 251 may be input to the trigger logic circuit 260 to be combined with other trigger events, according to known methods, to produce an overall trigger signal 261 for causing the oscilloscope 200 to trigger and acquire a waveform into memory.

Figure 3:
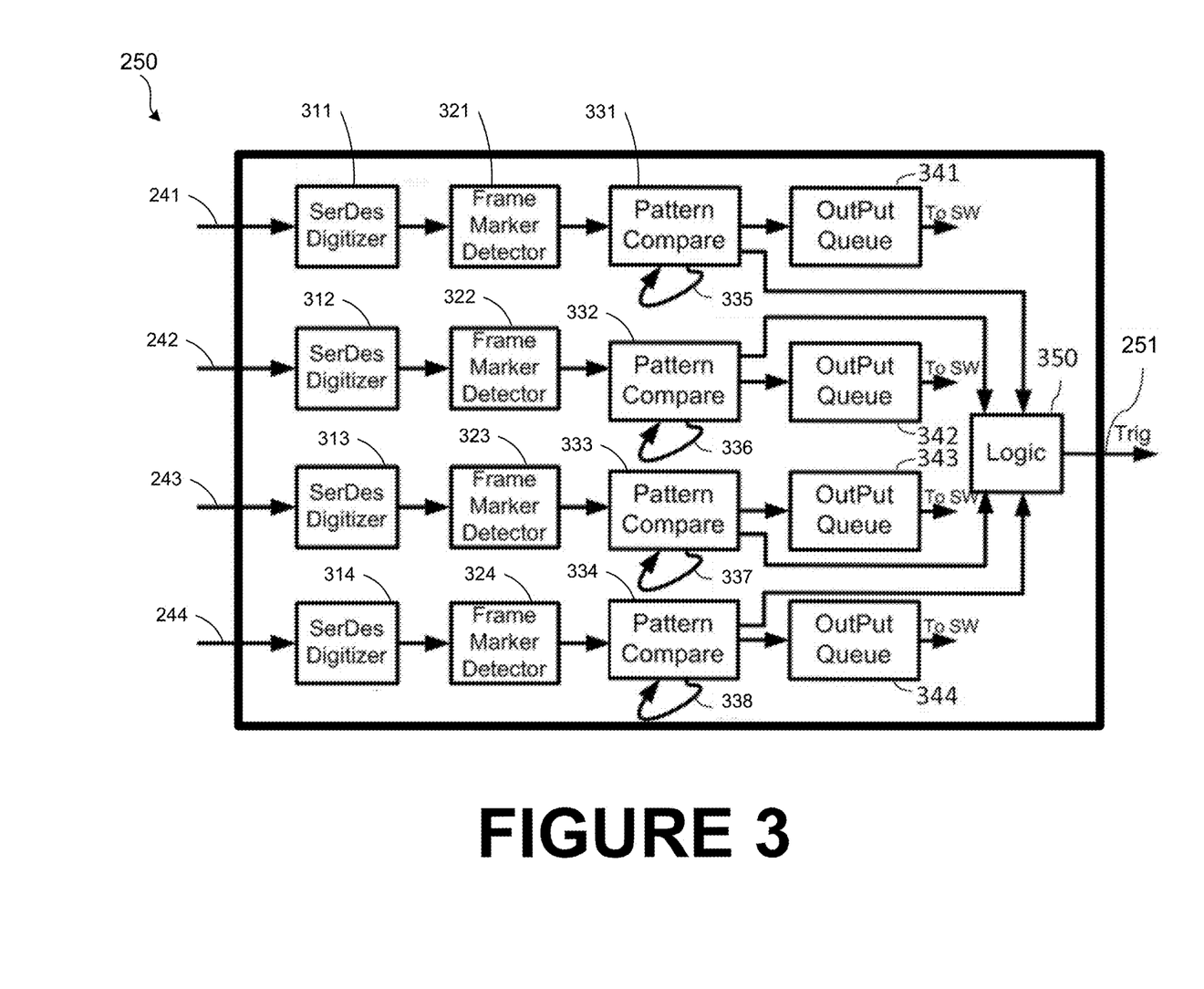
FIG. 3 is a detailed block diagram of a portion of trigger circuitry in accordance with certain implementations of the disclosed technology.
Figure 7:
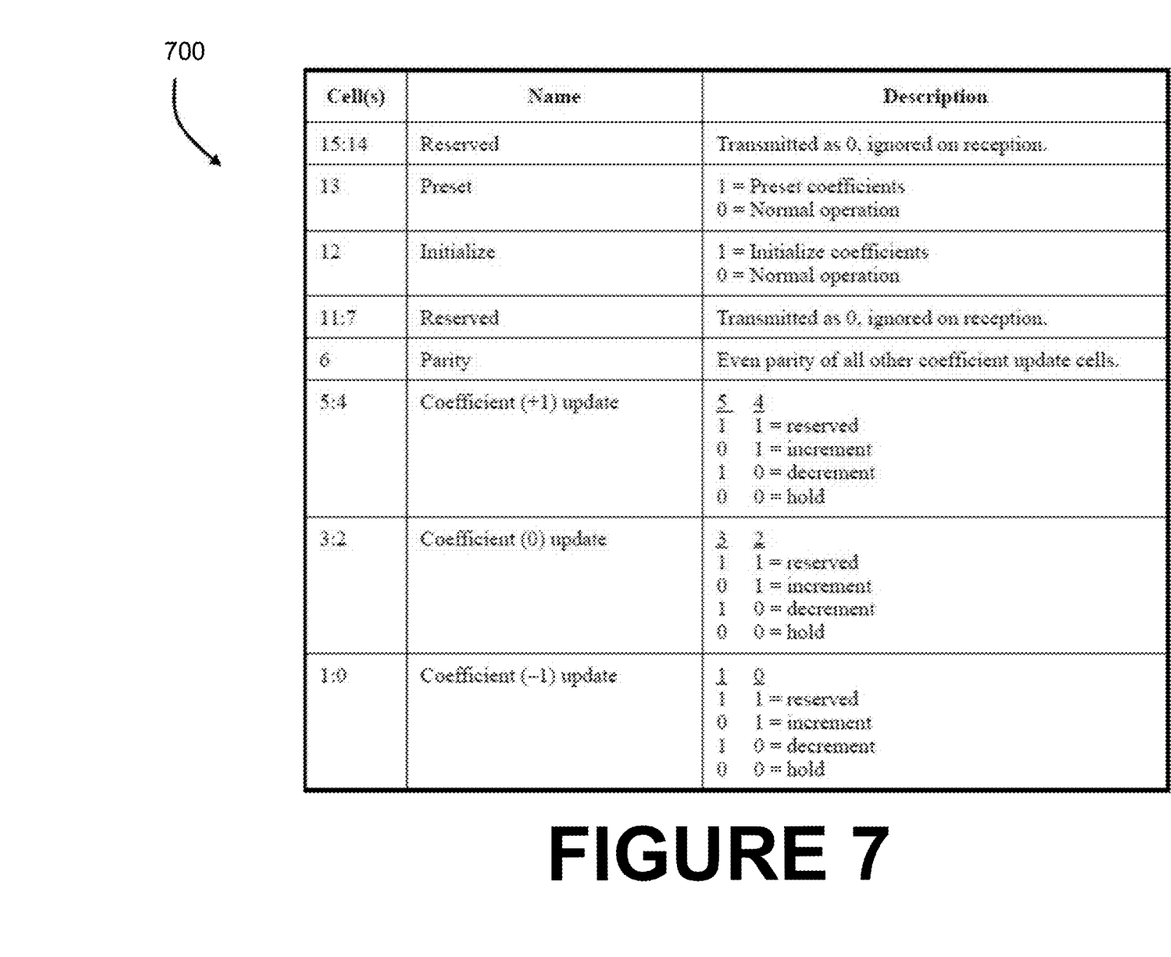
FIG. 7 is an example of conventional control channel data concerning coefficient update requests.
Figure 8:
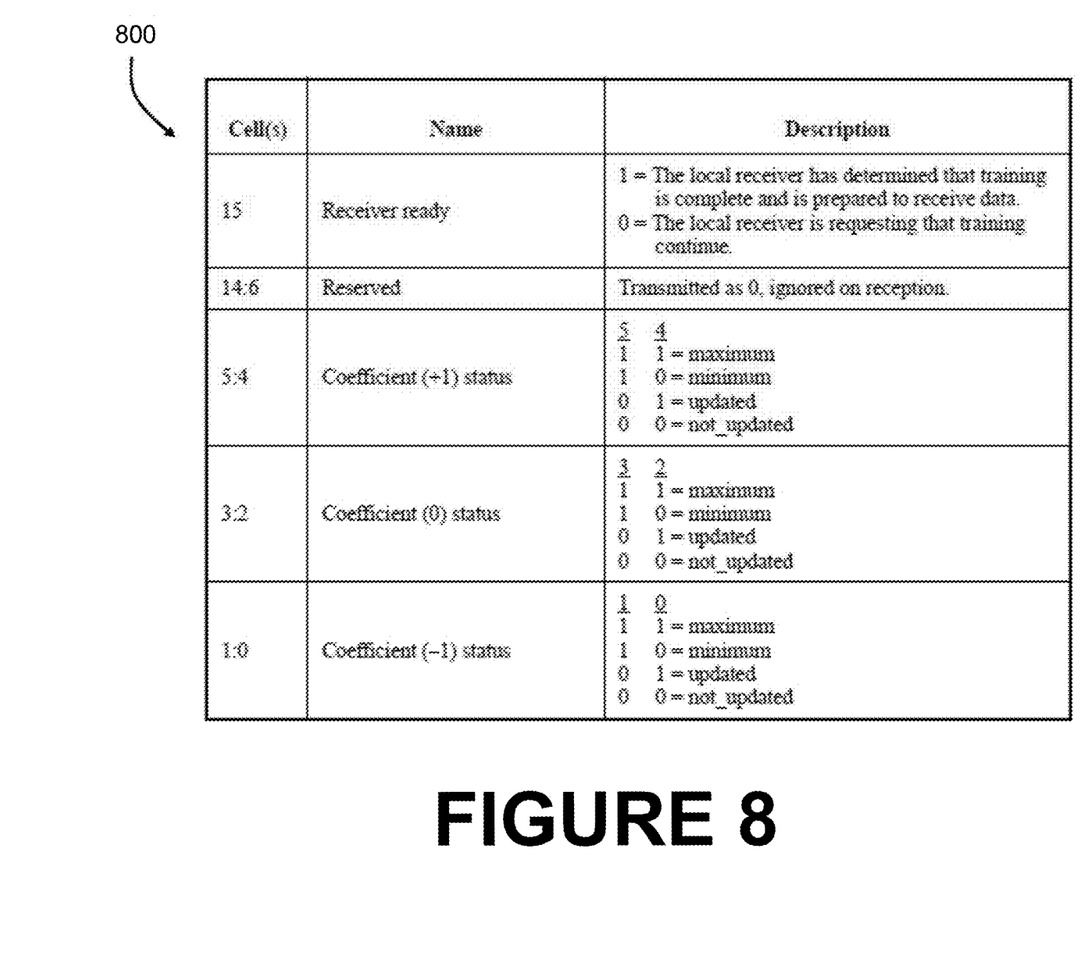
FIG. 8 is an example of conventional control channel data concerning status report responses.

FIG. 3 illustrates a block diagram of the structure of an example embodiment of the serial trigger circuit 250 of FIG. 2. The serial trigger circuit 250 accepts as inputs the total of four channels of analog serial data streams 241-244. Each channel is input, respectively, to a Serializer-Deserializer (SerDes) digitizer block 311-314. Each SerDes digitizer block 311-314 continuously samples the analog data streams 241-244 to convert into digital data streams, which are then continuously monitored by the corresponding frame marker detector 321-324. Once each frame marker detector locates the start of the control channel information, it is passed on to the corresponding pattern compare block 331-334. Each pattern compare block 331-334 first decodes the differential Manchester encoded control channel data to the 16-bit coefficient update and 16-bit status report values, such as those shown in table 700 in FIG. 7 and table 800 in FIG. 8, respectively, which are then compared to a stored pattern.

Each pattern compare block 331-334 then continuously compares the decoded data to the stored pattern. If the data and the stored pattern do not match, the data is stored in the output queue. In other words, when each pattern compare block 331-334 finds that there has been a transition in the decoded data, the data is stored in the respective Output Queue 341-344, along with the current timestamp to record when the change occurred. Importantly, each pattern compare block 331-334 also updates the stored pattern to the new decoded data value, through the respective loopback path 335-338. Thus, only the transitions in the data values are stored to memory. When a transition in the data values is detected, each pattern decode and compare block 331-334 may also output a signal to a consolidated logic block 350, which may then generate the trigger output signal 251. Each pattern decode and compare block 331-334 can also be configured to output a "link training state" to the consolidated logic block 350 also. This link training state is asserted whenever each pattern decode and compare block 331-334 is receiving any control channel data. As long as control channel data continues to be received the output to the consolidated logic 350 stays asserted. If the control channel data stops and a preset timer expires then the "link training state" returns to a deasserted state. This allows the logic block 350 to be configured to generate the trigger output signal 251 on the first or last link training frame on any specified channel.

Although FIGS. 2 and 3 show the serial trigger circuit 250 as being implemented in an FPGA, this is merely one embodiment. The serial trigger circuit may alternatively be implemented in an ASIC, a programmable logic device, discrete circuitry, firmware, software, or a combination of any of these.

With the structure of the trigger signal path illustrated in FIGS. 2 and 3, the oscilloscope 200 can capture a complete history of the Link Training negotiations by continuously monitoring multiple analog signals representing both sides of full duplex lanes in real-time by pattern matching the Link Training Frame Marker and the subsequent negotiation request/response data values. By comparing the digitized version of the incoming signal against a pattern and by storing only those Control Channel data values that do not match the current compare pattern, only the transitions in the data values are stored. This reduces the amount of data needing to be presented to the user by five orders of magnitude, from approximately 5 million to 50 control channel data values per lane, but nonetheless retains the complete substantive history of the Link Training negotiations.

The transitioned data values that are stored in the Output Queue 341-344 are accessible by the software on the oscilloscope 200. Since the Link Training data is analyzed and filtered, or sifted (condensed), in real-time, a Results Table containing only the non-redundant data can be presented to a user almost immediately after completion of the Link Training negotiation. Therefore, in comparison to the approximately one hour link training analysis time required using traditional post-acquisition analysis methods, embodiments of this new analysis method allow the data to be presented to the user in a few seconds for a 100 Gbps Ethernet negotiation that is 500 ms long.

Further, since one 4-channel oscilloscope 200 can monitor two full-duplex lanes, and since two such oscilloscopes 200 can be synchronized and used together, using synchronization technologies such as UltraSync made by Tektronix, Inc., all four lanes of a 100 Gbps Ethernet Link Training session, for example, can be monitored and the results for the entire session posted in a a few seconds. Such immediate feedback is effective in simplifying Link Training debugging.

Figure 4:
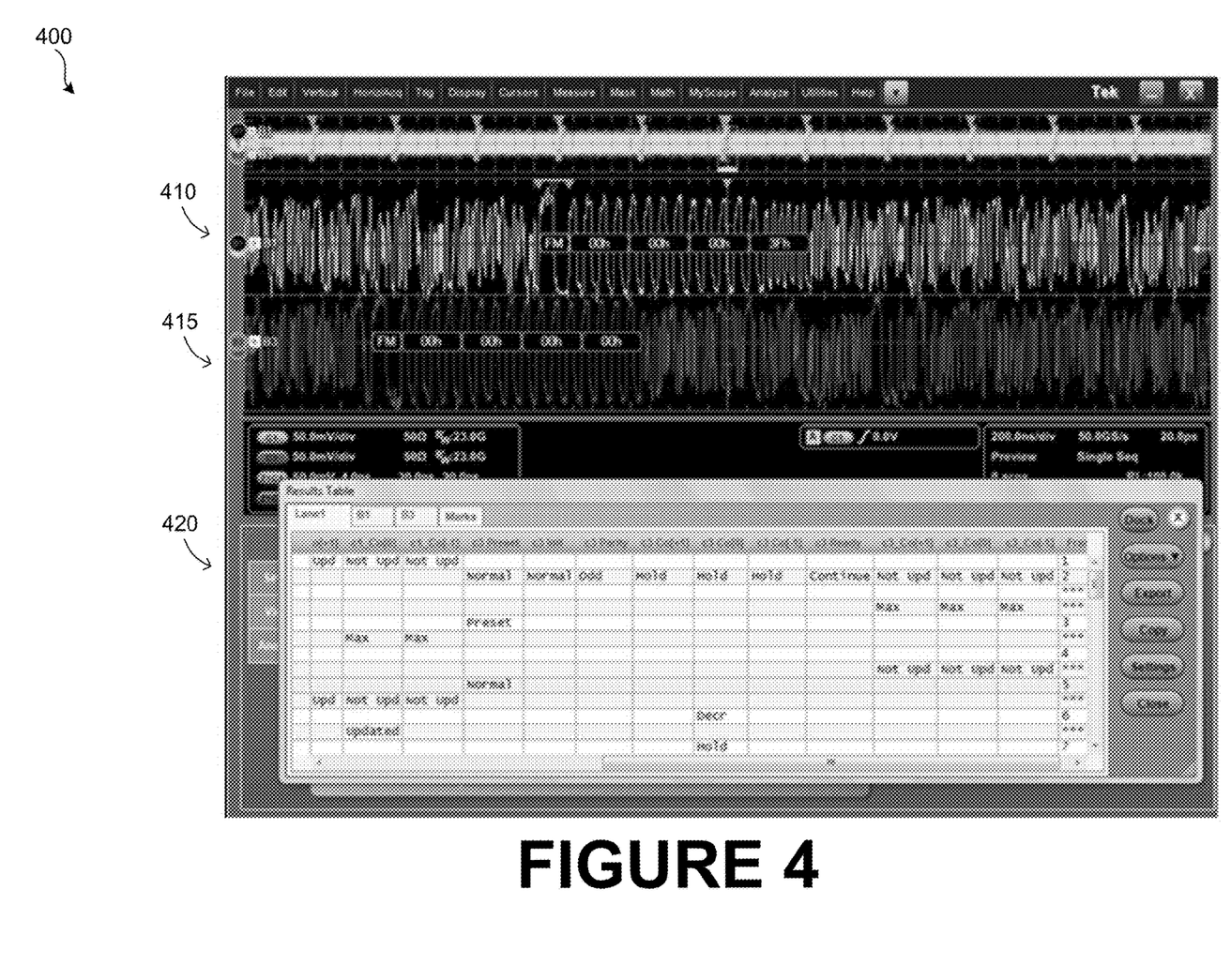
FIG. 4 is a screenshot of a user interface display in accordance with certain implementations of the disclosed technology.

FIG. 4 illustrates an example of a user interface display 400 for the oscilloscope 200 of FIG. 2 for displaying the results of the analysis and extraction of the link training information. The upper portion of the display 400 includes waveform portions 410 and 415, showing triggered display of the actual analog signals from which the link training data was extracted. The lower portion of the display 400 shows a Results Table portion 420, showing the Link Training Control Channel Information that was extracted, decoded, and filtered in real-time by the oscilloscope 200.

Figure 5:
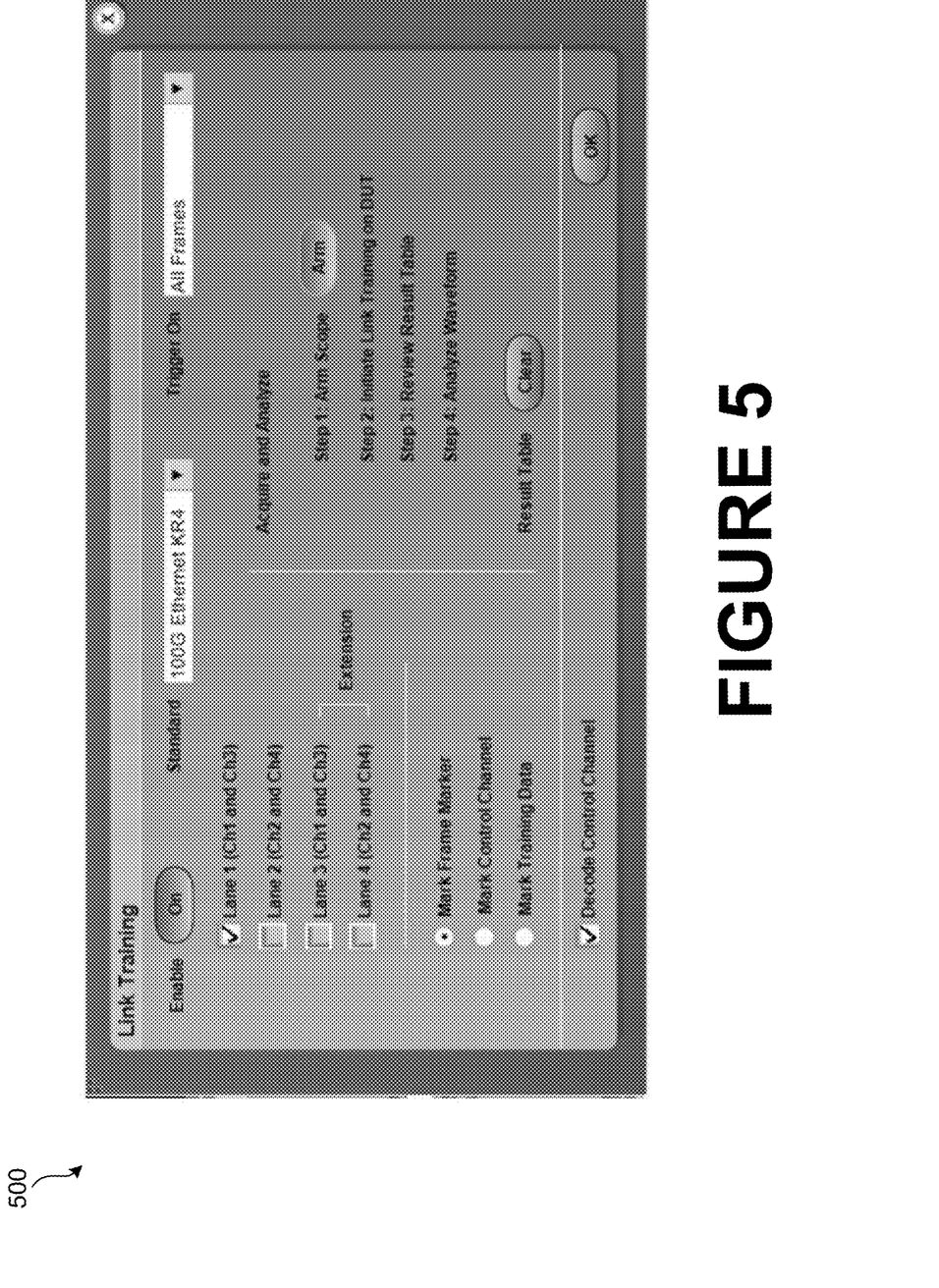
FIG. 5 is an example of a screen shot of a Link Training Control Window in accordance with certain implementations of the disclosed technology.

FIG. 5 is an example of an example of a screen shot of a Link Training Control Window 500 in accordance with certain implementations of the disclosed technology. In the example, a user can select one or more lanes to be monitored. The user can also select whether to mark a frame marker, control channel, or training data, for example.

Figure 6:
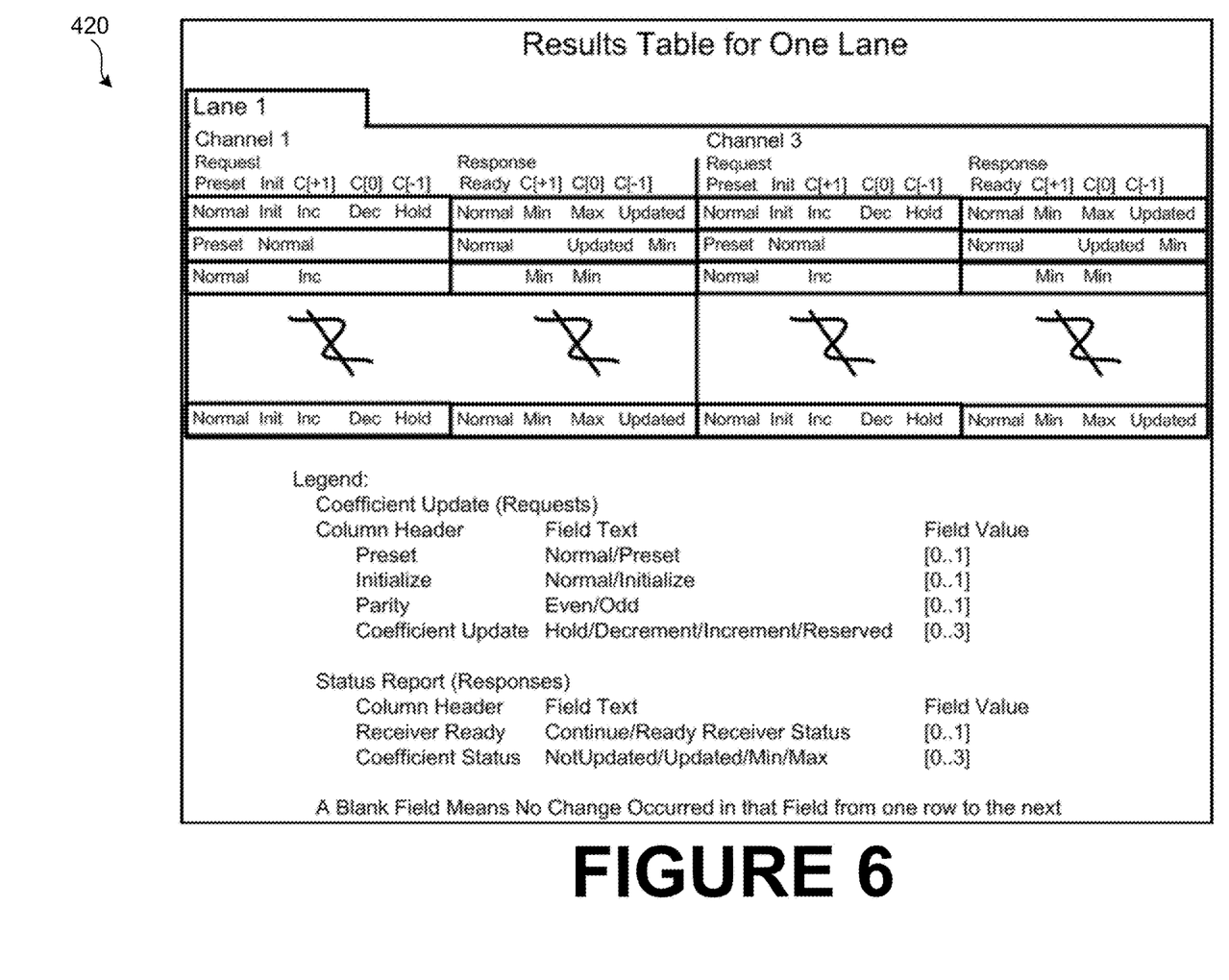
FIG. 6 is a detailed illustration of a display of analysis results in accordance with certain implementations of the disclosed technology.

FIG. 6 illustrates a detailed view of an example embodiment of the Results Table 420. The Results Table 420 in FIG. 6 shows only one tab of results for one lane of data. Additional lanes may be displayed on additional tabs. To make reading the Results Table 420 even easier for a user, the table may color-coded, or otherwise highlight, certain control channel data values, such as, for example where one transceiver fails to set a coefficient update value in response to a request from the other transceiver.

As mentioned above, the serial trigger circuit 250 of FIGS. 2 and 3 may, in the course of monitoring the link training, generate trigger signals in response to certain specified events occurring during the link training process. For example, the oscilloscope 200 of FIG. 2 can optionally be triggered to capture digitized waveforms in the usual fashion whenever the Control Channel data changes. In particular, the oscilloscope 200 with a "Fast Frame" (segmented acquisition memory) utility may be used to capture multiple short records of the digitized waveform of the fixed-length Frame Marker/Control Channel blocks/Training Data sequence, which may be marked and decoded in the usual way to delineate these waveform sections for analysis with DPOJET, or other scope analysis tools, to determine the amount of eye closure, jitter, etc. In fact, DPOJET measurements can be restricted to a single Link Training (e.g., PRBS) data section by using the Marks and/or Waveform Cursors to measure the actual pre-emphasis values or other signal characteristics given the particular transmitter coefficients in operation at that time. It should be noted that when implemented on an oscilloscope, it is the combination of real-time capture of signal waveforms and control channel coefficient update requests and status report responses that provides detailed analysis of both the signal characteristics after specific Link Training events, and the logical sequence of events during Link Training.

Additional events occurring within the Control Channel data can also be used to trigger the oscilloscope 200, such as when the Control Channel countdown value reaches zero, indicating completion of a given lane's Link Training. Additional trigger criteria may be applied, such as to trigger on the last occurrence of a Control Channel Frame Marker, or to trigger on the first lane to complete its Link Training, or to trigger only when training is complete on all channels, or to trigger when a Control Channel coefficient changes on a specific lane, or when Link Training completes without some lane's requested coefficient change having been honored.

Further, some Link Training Control Channel data transitions are termed illegal by a given network protocol's specification, and these illegal events can be used to trigger the scope or be highlighted in the results table to inform the user of the infraction.

In this way, both the essential Link Training negotiation history (requests and responses for transmitter coefficient updates and status, and the Link Training (e.g., PRBS) waveform data can be exactly tracked and recorded by the oscilloscope 200 in not much more time than it takes for the Link Training process itself to complete, thereby significantly reducing analysis time and the quantity of data a user must sift through, making debugging high-speed serial network operation much more feasible.

EXAMPLES

Illustrative examples of the technologies disclosed herein are provided below. An embodiment of the technologies may include any one or more, and any combination of, the examples described below.

Example 1 includes a test and measurement instrument, comprising inputs for receiving a plurality of analog input signals carrying link training information; and a link training information extractor coupled to the inputs and structured to select particular link training information from the plurality of analog signals, the particular link training information including control channel data, the information extractor including memory to store control channel data values, a comparator structured to evaluate control channel values from the analog input signals against the stored control channel values, and a loopback facility structured to store new control channel values from the analog input signals into the memory when channel values from the analog input signals do not match the stored control channel data values.

Example 2 includes the test and measurement instrument of Example 1, or any other example test and measurement instrument described herein, in which the information extractor further comprises an output queue structured to output control channel values from the analog input signals when the control channel values from the analog input signals do not match stored control channel data values.

Example 3 includes the test and measurement instrument of Example 2, or any other example test and measurement instrument described herein, further comprising trigger circuitry structured to generate a trigger signal when the control channel values from the analog input signals do not match stored control channel data values.

Example 4 includes the test and measurement instrument of Example 3, or any other example test and measurement instrument described herein, in which the test and measurement instrument is structured to store digitized data created from the plurality of analog signals after the trigger signal is generated.

Example 5 includes the test and measurement instrument of Example 4, or any other example test and measurement instrument described herein, in which the trigger circuitry is structured to timestamp the stored digitized data when the trigger signal is generated.

Example 6 includes the test and measurement instrument of Example 3, or any other example test and measurement instrument described herein, further comprising trigger circuitry structured to suppress a trigger signal for a particular channel so long as the test and measurement instrument is receiving link training information for the particular channel.

Example 7 includes the test and measurement instrument of Example 3, or any other example test and measurement instrument described herein, in which the trigger circuitry is structured to generate the trigger signal when the plurality of analog input signals include an indication of a first link training frame or a last link training frame.

Example 8 includes the test and measurement instrument of any of Examples 1-7, or any other example test and measurement instrument described herein, further comprising a link training information generator structured to create a table of stored link training data.

Example 9 includes the test and measurement instrument of any of Examples 1-8, or any other example test and measurement instrument described herein in which the instrument is a RealTime oscilloscope and in which the link training data accords to an Ethernet protocol.

Example 10 includes the test and measurement instrument of any of Examples 1-9, or any other example test and measurement instrument described herein in which the instrument is a RealTime oscilloscope having a four-channel input, in which each of the four channels is respectively coupled to four half-duplex lanes of data.

Example 11 is directed to a method of selecting certain link training information in a test and measurement device coupled to at least one lane of a serial data link, the method comprising storing control data values received from the at least one serial data link; comparing newly acquired control data values about the at least one serial data link to the previously stored control data values; and storing the newly acquired control data values only when they do not match the previously stored control data values.

Example 12 is directed to the method of selecting certain link training information in a test and measurement device of Example 11, or any other example method described herein, further comprising building a table of the stored control data values.

Example 13 is directed to the method of selecting certain link training information in a test and measurement device of Examples 11-12, or any other example method described herein, further comprising replacing the stored control data values with the newly acquired control data values about the at least one serial data link when the newly acquired control data values about the at least one serial data link does not match the stored control data values.

Example 14 is directed to the method of selecting certain link training information in a test and measurement device of Examples 11-13, or any other example method described herein, further comprising generating a trigger signal when the control channel values from the at least one serial data link do not match stored control channel data values.

Example 15 is directed to the method of selecting certain link training information in a test and measurement device of Examples 11-14, or any other example method described herein, further comprising further comprising storing digitized data created from the at least one serial data link in an acquisition memory after the trigger signal is generated.

Example 16 is directed to the method of selecting certain link training information in a test and measurement device of Examples 11-15, or any other example method described herein, further comprising timestamping the stored digitized data when the trigger signal is generated.

Example 17 is directed to the method of selecting certain link training information in a test and measurement device of Examples 11-16, or any other example method described herein, further comprising generating a trigger signal when received data from the at least one serial data link includes an indication of a first link training frame or a last link training frame.

Example 18 is directed to the method of selecting certain link training information in a test and measurement device of Examples 11-17, or any other example method described herein, further comprising generating a trigger signal when received data from a first of the at least one serial data links includes an indication that the first serial data link has finished link training.

Example 19 is directed to the method of selecting certain link training information in a test and measurement device of Examples 11-18, or any other example method described herein, in which the instrument is a RealTime oscilloscope coupled to two lanes of data transmitted according to an Ethernet protocol.

The term "controller" and "processor" as used herein is intended to include microprocessors, microcomputers, ASICs, and dedicated hardware controllers. One or more aspects of the invention may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other electronic device.

The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Having described and illustrated the principles of the disclosed technology in a preferred embodiment thereof, it should be apparent that the disclosed technology can be modified in arrangement and detail without departing from such principles. We claim all modifications and variations coming within the spirit and scope of the following claims.

What is claimed is:

1. A test and measurement instrument for monitoring a link training session between at least two devices under test, comprising:
    a first input configured to electrically couple to a first transmission line for receiving an analog signal carrying link training information sent from a first transmitter of a first device under test;
    a second input configured to electrically couple to a second transmission line for receiving an analog signal carrying link training information sent from a second transmitter of a second device under test; and
    a link training information extractor coupled to the first input and the second input and structured to select particular link training information from the analog signals, the particular link training information including control channel data, the information extractor including:
        memory to store control channel data values,
        a frame marker detector structured to locate a start of control channeling information including control channel values in the link training information,
        a comparator structured to evaluate the detected control channel values from the analog input signals against the stored control channel values,
        a loopback facility structured to store new control channel values as the stored control channel values from the analog input signals into the memory when the detected channel values from the analog input signals do not match the stored control channel data values, and an output queue structured to only store each of the new control channel values with a timestamp when the detected channel values from the analog input signals do not match the stored control channel data values.

2. The test and measurement instrument of claim 1, further comprising trigger circuitry structured to generate a trigger signal when the control channel values from the analog input signals do not match stored control channel data values.

3. The test and measurement instrument of claim 2, wherein the test and measurement instrument is structured to store digitized data created from the plurality of analog signals after the trigger signal is generated.

4. The test and measurement instrument of claim 3, wherein the trigger circuitry is structured to timestamp the stored digitized data when the trigger signal is generated.

5. The test and measurement instrument of claim 1, further comprising trigger circuitry structured to suppress a trigger signal for a particular channel so long as the test and measurement instrument is receiving link training information for the particular channel.

6. The test and measurement instrument of claim 2, wherein the trigger circuitry is structured to generate the trigger signal when the plurality of analog input signals include an indication of a first link training frame or a last link training frame.

7. The test and measurement instrument according to claim 1, further comprising a link training information generator structured to create a table of stored link training data.

8. The test and measurement instrument according to claim 1 in which the instrument is a RealTime oscilloscope and in which the link training data accords to an Ethernet protocol.

9. A test and measurement instrument for monitoring a link training session between at least two devices under test, comprising:

a first input configured to electrically couple to a first transmission line for receiving an analog signal carrying link training information sent from a first transmitter of a first device under test;

a second input configured to electrically couple to a second transmission line for receiving an analog signal carrying link training information sent from a second transmitter of a second device under test; and a link training information extractor coupled to the first input and the second input and structured to select particular link training information from the analog signals, the particular link training information including control channel data, the information extractor including:

memory to store control channel data values, a comparator structured to evaluate control channel values from the analog input signals against the stored control channel values, and a loopback facility structured to store new control channel values as the stored control channel values from the analog input signals into the memory when channel values from the analog input signals do not match the stored control channel data values, in which the instrument is a RealTime oscilloscope having a four-channel input, in which each of the four channels is respectively coupled to four half-duplex lanes of data.

10. A method of selecting certain link training information in a test and measurement device coupled to at least one lane of a serial data link, the method comprising:

receiving link training information;

locating a start of control channel information including control channel values in the link training information;

storing control channel values received from the at least one serial data link;

receiving newly acquired control channel values from the at least one serial data link;

comparing the newly acquired control channel values from the at least one serial data link to the previously stored control channel values; and storing the newly acquired control channel values as the stored control channel values only when they do not match the previously stored control channel values; and storing the newly acquired control channel values with a timestamp in an output queue when the newly acquired control channel values do not match the previously stored control channel values.

11. The method of selecting certain link training information according to claim 10, further comprising building a table of the stored control channel values.

12. The method of selecting certain link training information according to claim 10, further comprising generating a trigger signal when the control channel values from the at least one serial data link do not match stored control channel data values.

13. The method of selecting certain link training information according to claim 10, further comprising storing digitized data created from the at least one serial data link in an acquisition memory after the trigger signal is generated.

14. The method of selecting certain link training information according to claim 10, further comprising timestamping the stored digitized data when the trigger signal is generated.

15. The method of selecting certain link training information according to claim 10, further comprising generating a trigger signal when received data from the at least one serial data link includes an indication of a first link training frame or a last link training frame.

16. The method of selecting certain link training information according to claim 10, further comprising generating a trigger signal when received data from a first of the at least one serial data links includes an indication that the first serial data link has finished link training.

17. A method of selecting certain link training information in a test and measurement device coupled to at least one lane of a serial data link, the method comprising:

receiving from the at least one lane of the serial data link newly acquired control channel values;

storing control channel values received from the at least one serial data link;

comparing the newly acquired control channel values from the at least one serial data link to the previously stored control channel values; and storing the newly acquired control channel values as the stored control channel values only when they do not match the previously stored control channel values, in which the test and measurement device is a RealTime oscilloscope coupled to four half-duplex lanes of data transmitted according to an Ethernet protocol.

* * * * *